US012790801B2

(12) United States Patent
Asano

(10) Patent No.: US 12,790,801 B2
(45) Date of Patent: Nov. 10, 2026

(54) CONTROL DEVICE AND CONTROL METHOD OF FAUCET DEVICE, AND FAUCET DEVICE

(71) Applicant: Murata Manufacturing Co., Ltd., Nagaokakyo (JP)

(72) Inventor: Kosei Asano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 167 days.

(21) Appl. No.: 18/938,335

(22) Filed: Nov. 6, 2024

(65) Prior Publication Data

US 2025/0059745 A1 Feb. 20, 2025

Related U.S. Application Data

(63) Continuation of application No. PCT/JP2023/016684, filed on Apr. 27, 2023.

(30) Foreign Application Priority Data

May 12, 2022 (JP) ................................ 2022-079056

(51) Int. Cl.
*E03C 1/05* (2006.01)
*G01S 13/88* (2006.01)

(52) U.S. Cl.
CPC .............. *E03C 1/057* (2013.01); *G01S 13/88* (2013.01)

(58) Field of Classification Search
CPC ................................ E03C 1/057; G01S 13/88
(Continued)

(56) References Cited

U.S. PATENT DOCUMENTS 6,568,655 B2 * 5/2003 Paese ...................... G01S 13/18 4/623
8,612,057 B2 * 12/2013 Murata .................. G01S 7/415 700/282
(Continued)

FOREIGN PATENT DOCUMENTS

CN 112361057 A 2/2021
JP 2010-145379 A 7/2010
(Continued)

OTHER PUBLICATIONS

International Search Report and Written Opinion mailed on Jun. 20, 2023, received for PCT Application PCT/JP2023/016684, filed on Apr. 27, 2023, 8 pages including English Translation.

*Primary Examiner* — Huyen D Le
(74) *Attorney, Agent, or Firm* — XSENSUS LLP

(57) ABSTRACT

To provide a faucet device and its control device and control method capable of appropriately determining the presence or absence of a detection target around the discharge portion in a small size and at a low price. A control device of a faucet device includes a radar, a calculator, and a control unit. The radar includes a transmission antenna and a reception antenna. The transmission antenna transmits a radio wave. The reception antenna receives a reflected wave of the radio wave that hits water and is reflected by the water. A calculation unit calculates a signal intensity distribution of the reflected wave for each arrival angle and arrival distance. A determination unit outputs a supply signal to the control unit when the reflected wave has a signal intensity exceeding a threshold, and outputs a stop signal to the control unit when the reflected wave no longer exceeds the threshold.

20 Claims, 6 Drawing Sheets

(58) Field of Classification Search
USPC .............................................................. 4/623
See application file for complete search history.

(56) References Cited

U.S. PATENT DOCUMENTS

| | | | | |
|---|---|---|---|---|
| 2013/0160202 A1* | 6/2013 | Murata | .................. E03C 1/057 4/623 | |
| 2018/0371729 A1* | 12/2018 | Sugino | .................. G01S 13/341 | |
| 2022/0154437 A1* | 5/2022 | Yang | ....................... E03C 1/057 | |

FOREIGN PATENT DOCUMENTS

| | | | |
|---|---|---|---|
| JP | 2013-057200 | A | 3/2013 |
| JP | 2016-183953 | A | 10/2016 |
| WO | 2015/092993 | A1 | 6/2015 |
| WO | 2017/115459 | A1 | 7/2017 |

* cited by examiner

CONTROL DEVICE AND CONTROL METHOD OF FAUCET DEVICE, AND FAUCET DEVICE

CROSS-REFERENCE TO RELATED APPLICATIONS

This application is the continuation application of PCT/JP2023/016684 filed on Apr. 27, 2023, which claims priority to Japanese Patent Application No. 2022-079056 filed on May 12, 2022, all of which are hereby expressly incorporated by reference into the present application.

TECHNICAL FIELD

The present invention relates to a control device and a control method of a faucet device which automatically controls supply and stop of a fluid, and to a faucet device.

BACKGROUND ART

A faucet device of this type and its control device and control method have been disclosed in Patent Document 1. In such a faucet device, a detector that detects a detection target in a discharge region of water discharged by a water discharge unit is provided in a spout attached to a sink. A frequency analysis unit converts a sensor signal into a frequency domain signal and extracts it as a signal for each of filter banks with different frequency bands. A recognition unit uses a frequency distribution of signals based on a plurality of signals for each of filter banks as detection data. The detection target is recognized by comparing the detection data with sample data stored in a database.

CITATION LIST

Patent Document

Patent Document 1: International Publication No. 2015/092993

SUMMARY OF INVENTION

Technical Problem

However, in the conventional faucet device and its control device and control method described above, it is necessary to compare the detection data with the sample data stored in the database to recognize the detection target. Therefore, a complicated pattern recognition process is required in the recognition unit to compare each piece of data, and a database for storing the sample data is required in the control device. Thus, the faucet device and its control device become large, and the control method of the faucet device becomes complicated. Therefore, conventionally, the control device and control method of the faucet device capable of appropriately determining the presence or absence of a detection target around the discharge portion cannot be provided in a small size and at a low price.

Solution to Problem

The present invention is made to solve the above problems, and constitutes a control device of a faucet device that includes:

a transmission antenna that transmits a radio wave;

a reception antenna that receives a reflected wave of the radio wave that hits a fluid and is reflected by the fluid;

a calculation unit (i.e., calculator) that calculates a signal intensity distribution of the reflected wave for each arrival angle and arrival distance;

a determination unit (i.e., determinator) that determines whether a supply condition and a stop condition of the fluid are satisfied, and outputs a supply signal or a stop signal based on a determination result; and a control unit (i.e., circuitry or control circuitry) that controls a supply of the fluid or a stop of the supply of the fluid based on the supply signal or the stop signal, wherein when only the fluid is being discharged, the determination unit determines a predetermined bin with a large signal intensity of the reflected wave among a plurality of bins partitioning the signal intensity distribution, determines a threshold based on the signal intensity of the predetermined bin, outputs the supply signal for supplying the fluid to the control unit when a reflected wave with a signal intensity exceeding the threshold is detected at the predetermined bin, and outputs the stop signal for stopping the supply of the fluid to the control unit when the reflected wave with a signal intensity exceeding the threshold is no longer detected at the predetermined bin.

Further, the present invention constitutes a control method of a faucet device that includes:

receiving, at a reception antenna and when only a discharged fluid is present, a reflected wave of a radio wave transmitted from a transmission antenna that hits the fluid and is reflected by the fluid;

calculating a signal intensity distribution of the reflected wave received by the reception antenna for each arrival angle and arrival distance;

determining a predetermined bin with a large signal intensity of the reflected wave among a plurality of bins partitioning the signal intensity distribution;

determining a threshold based on the signal intensity of the predetermined bin; and outputting a supply signal for supplying the fluid to a control unit that controls a supply of the fluid or a stop of the supply of the fluid when a reflected wave with a signal intensity exceeding the threshold is detected at the predetermined bin, and outputting a stop signal for stopping the supply of the fluid to the control unit when the reflected wave with a signal intensity exceeding the threshold is no longer detected at the predetermined bin.

According to these configurations, when only a discharged fluid is present, the signal intensity distribution of the reflected wave received by the reception antenna for each arrival angle and arrival distance is calculated. Among a plurality of bins partitioning the calculated signal intensity distribution, a predetermined bin with a large signal intensity of the reflected wave is determined, thereby estimating that the discharge region of the fluid is present at the arrival angle and arrival distance of the reflected wave assigned to the predetermined bin. Therefore, when a reflected wave with a signal intensity exceeding a predetermined threshold is subsequently detected at the predetermined bin, it is determined that the detection target has entered the discharge region of the fluid, so that the control unit controls the valve to discharge the fluid. When the reflected wave with a signal intensity exceeding the predetermined threshold is no longer detected at the predetermined bin, it is determined that the detection target has left the discharge region of the fluid, so that the control unit controls the valve to stop the fluid supply.

Further, the present invention constitutes a faucet device that includes:

the control device of a faucet device described above;

a valve that supplies the fluid or stops the supply of the fluid;

a discharge portion that is connected to the valve and that discharges the fluid; and a water receiving bowl.

Advantageous Effects of Invention

According to the present invention, a detection target can be detected in the discharge region of the fluid without performing the conventional complicated pattern recognition process. Therefore, the faucet device and its control device do not require a database for storing the sample data, so that the faucet device and its control device can be reduced in size. Further, since the control method of the faucet device does not require the pattern recognition process, the process can be simplified. As a result, it is possible to provide a faucet device capable of appropriately determining the presence or absence of the detection target around the discharge portion, and its control device and control method in a small size and at a low price.

DESCRIPTION OF EMBODIMENTS

Embodiments for implementing a faucet device and its control device and control method of the present invention will be described below.

Figure 1:
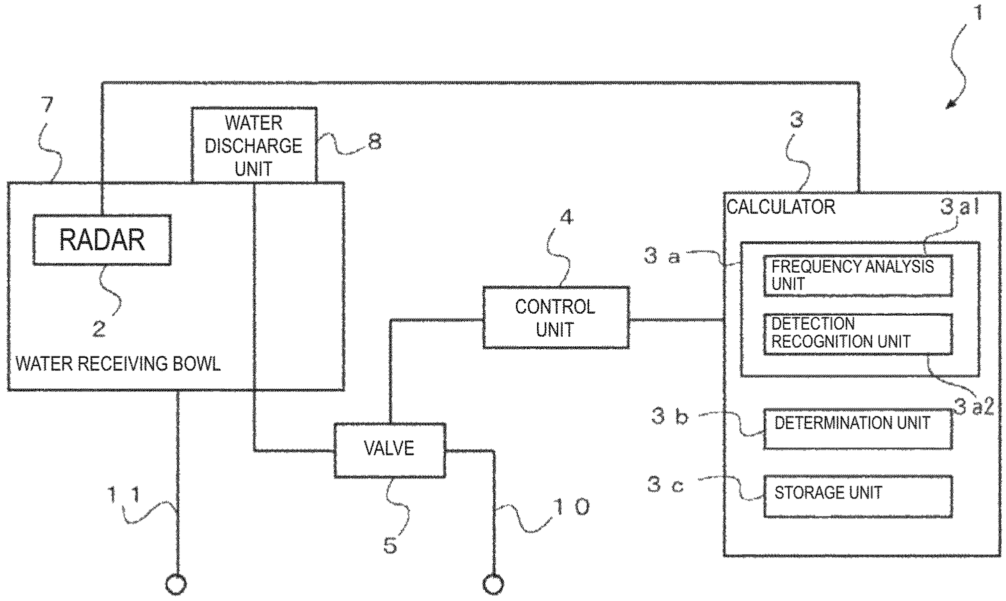
FIG. 1 is a block diagram showing a schematic configuration of a faucet device and its control device according to an embodiment of the present invention.

FIG. 1 is a block diagram showing a schematic configuration of a faucet device 6 and its control device 1 according to an embodiment of the present invention. The control device 1 includes an FMCW (Frequency Modulated Continuous Wave) radar 2, a calculator 3, and a control unit 4 for controlling a valve 5. Examples of the valve 5 include an automatic valve. Examples of the automatic valve include an external force type automatic valve. Examples of the external force type automatic valve include a solenoid valve, a control valve, a pneumatic valve, and the like.

Figure 2:
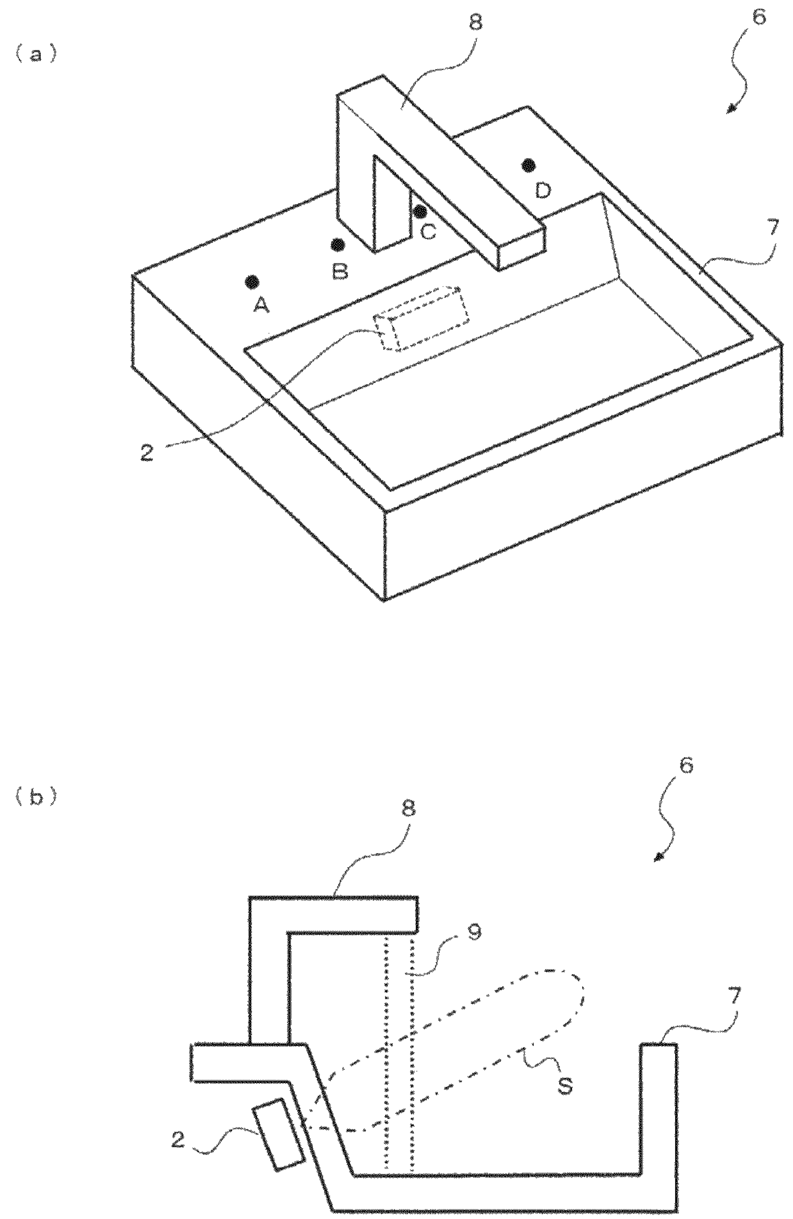
FIG. 2 is a diagram showing a configuration of a faucet device according to an embodiment.

FIG. 2(*a*) is a perspective view of the faucet device 6 to which the FMCW radar 2 is attached, and FIG. 2(*b*) is a cross-sectional view. The faucet device 6 is composed of a spout, as a water discharge unit 8, and a water receiving bowl 7, the water discharge unit 8 being erected on the water receiving bowl 7. The water discharge unit 8 constitutes a discharge portion to discharge a fluid, and discharges water 9 as the fluid from a discharge port located at its tip end. The water receiving bowl 7 receives the water 9 discharged from the discharge port of the water discharge unit 8 on a water receiving surface. In the present embodiment, the FMCW radar 2 is provided on a back side of the water receiving surface of the water receiving bowl 7 below the water discharge unit 8.

The FMCW radar 2 includes, in the inside thereof, a transmission antenna and a reception antenna. The transmission antenna transmits a radio wave S to the inside of the water receiving portion of the water receiving bowl 7 that receives the discharged water 9. The reception antenna receives a reflected wave of the radio wave S which is transmitted from the transmission antenna, hits the water 9 discharged from the water discharge unit 8, and is reflected by the water 9.

The water 9 is supplied to the water discharge unit 8 through a water pipe 10 shown in FIG. 1 and via the valve 5. The water 9 discharged from the water discharge unit 8 and received in the water receiving bowl 7 is discharged through a pipe 11. The supply and stop of the water 9 supplied to the water discharge unit 8 by the valve 5 are controlled by the control unit 4. The control unit 4 controls the opening and closing of the valve 5 based on a supply signal or a stop signal for supplying water to the water discharge unit 8 or stopping the supply of the water 9 to the water discharge unit 8.

The operation of the FMCW radar 2 is controlled by the calculator 3. In the present embodiment, the calculator 3 is described as a PC (personal computer) provided outside the FMCW radar 2, but the calculator 3 may also be provided inside the FMCW radar 2. The calculator 3 includes a calculation unit 3*a*, a determination unit 3*b*, and a storage unit 3*c* (e.g., hardware-embedded memory). The storage unit 3*c* can also be designed "storage" or "memory". As described above, the radio wave S transmitted from the transmission antenna of the FMCW radar 2 hits the water 9 discharged from the water discharge unit 8, and is reflected by the water 9 and received as a reflected wave by the reception antenna. The calculation unit 3*a* calculates a signal intensity distribution of the reflected wave for each arrival angle and arrival distance.

Figure 3:
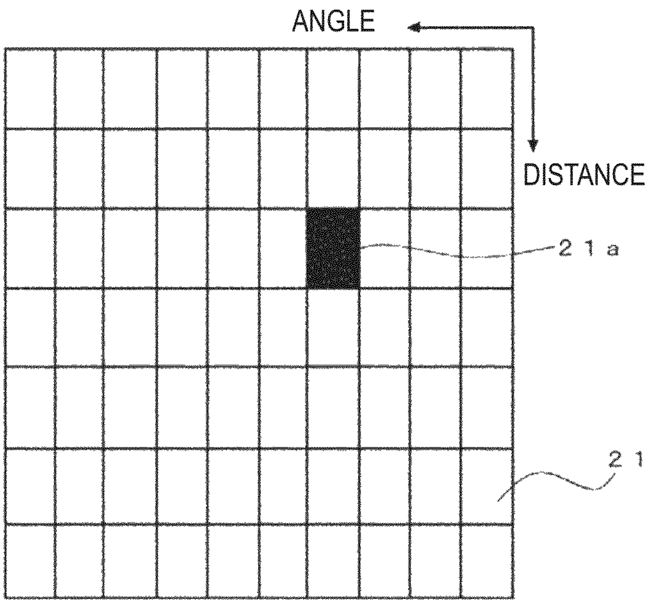
FIG. 3 is a mapping diagram showing a signal intensity distribution of received signals calculated by a calculation unit constituting a control device of a faucet device according to an embodiment, in which a bin with the signal intensity of the maximum received signal is indicated.

FIG. 3 is a mapping diagram illustrating the concept of the signal intensity distribution. The horizontal direction of the mapping diagram represents the arrival angle of the received signal of the reflected wave, and the vertical direction represents the arrival distance of the received signal from the water 9. The signal intensity distribution is partitioned by a plurality of bins 21, which divide the distribution at predetermined intervals as indicated as squares shown in FIG. 3. The signal intensity of the received signal of the reflected wave at the location of each bin 21 where the transmitted wave is received is assigned to the corresponding bin 21. The bin 21*a* filled in black represents the one with the maximum average signal intensity among the plurality of bins 21 in the signal intensity distribution shown in FIG. 3.

In the present embodiment, the calculation unit 3*a* is composed of a frequency analysis unit 3*a*1 and a detection recognition unit 3*a*2 (i.e., detection recognizer). The frequency analysis unit 3*a*1 converts a time signal of the received signal of the reflected wave transmitted from the transmission antenna as a chirp signal and received by the reception antenna into a frequency signal, and analyzes the frequency of the received signal. The frequency analysis is performed by a Fast Fourier Transform (FFT), a Discrete Fourier Transform (DFT), a Discrete Cosine Transform (DCT), or the like.

The detection recognition unit 3*a*2 estimates the arrival distance R of the received signal from the analyzed frequency f according to, for example, the following equation (1) where S is the slope of the chirp signal, and c is the speed of light.

$$R = (c/2S)\cdot f \tag{1}$$

The detection recognition unit 3*a*2 estimates the arrival angle θ of the received signal according to, for example, the following equation (2) based on the phase difference between a plurality of reception antennas arranged at equal intervals, where d is the distance between the reception antennas, λ is the wavelength of the reflected wave, and ω is the phase difference between the signals received by the reception antennas.

$$\theta = \sin^{-1}(\lambda\omega/2\prod d) \tag{2}$$

When only the water 9 discharged from the water discharge unit 8 is present in the vicinity of the water discharge unit 8 for a fixed period of time, the determination unit 3*b* determines the predetermined bin 21*a* with a large signal intensity of the received signal among the plurality of bins 21 in the signal intensity distribution calculated by the calculation unit 3*a*.

In the present embodiment, the determination unit 3*b* obtains a time average value of the signal intensity for each bin 21 from a fixed number of signal intensity distributions generated in a plurality with the lapse of time. The time average value is a value obtained by dividing, by a fixed number, the sum of the signal intensities with respect to the fixed number of signal intensity distributions generated in a plurality with the lapse of time. The obtained time average value is regarded as an average signal intensity of each bin 21. The determination unit 3*b* determines a bin 21 with the maximum intensity among the obtained average signal intensities as the predetermined bin. Here, description is made on the assumption that the bin 21*a* is determined to be the predetermined bin.

The calculator 3 includes the storage unit 3*c* that stores the signal intensity of the bin 21*a*, which has been determined as the predetermined bin by the determination unit 3*b*, the arrival angle θ, and the arrival distance R. The determination unit 3*b* calculates a signal intensity obtained by adding a fixed offset value to the stored average value of the signal intensity as a predetermined threshold, and stores the calculated predetermined threshold in the storage unit 3*c*. The offset value may be a predetermined value. Alternatively, the threshold may also be determined from the dispersion and/or time transition of the signal intensity of the received signal in the signal intensity distribution when the state of only the water 9 is observed. In other words, the threshold does not necessarily have to be calculated by adding the offset value to the stored average value of the signal intensity.

The determination unit 3*b* determines whether a supply condition and a stop condition of the water 9 are satisfied, and outputs a supply signal or a stop signal to the control unit 4 based on the determination result. In the present embodiment, when a received signal with a signal intensity exceeding the threshold is detected at the predetermined bin 21*a*, the determination unit 3*b* outputs the supply signal for supplying the water 9 to the control unit 4. When the received signal with a signal intensity exceeding the threshold is no longer detected at the predetermined bin 21*a*, the determination unit 3*b* outputs the stop signal for stopping the supply of the water 9 to the control unit 4.

When the supply signal for supplying the water 9 is inputted from the determination unit 3*b*, the control unit 4 controls to cause the valve 5 to open to supply the water 9 to the water discharge unit 8. When the stop signal for stopping the supply of the water 9 is inputted from the determination unit 3*b*, the control unit 4 controls to cause the valve 5 to close to stop the supply of the water 9 to the water discharge unit 8.

Figure 4:
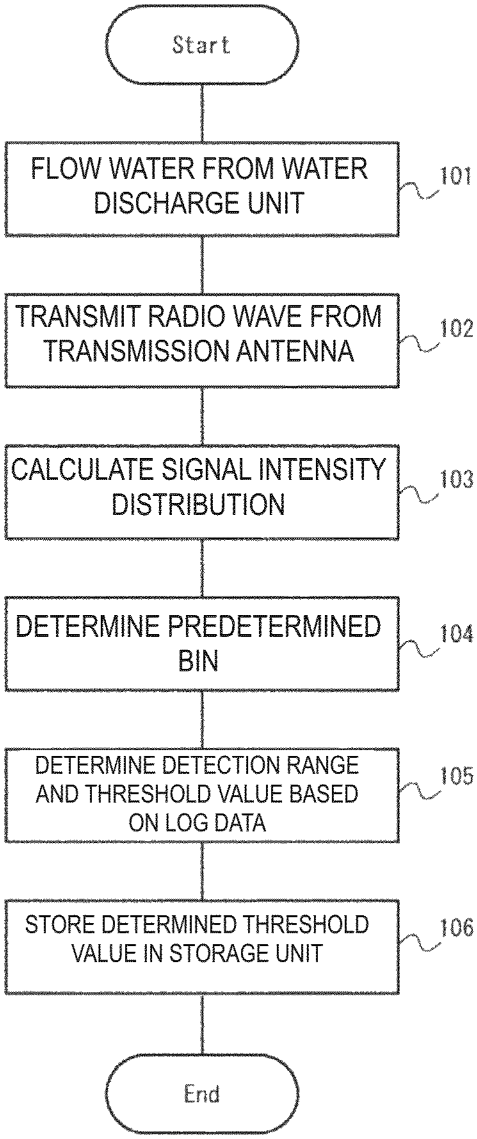
FIG. 4 is a flowchart showing schematic processing of a setting method of the control of a faucet device according to an embodiment of the present invention.

FIG. 4 is a flowchart schematically showing a setting method of the control of the faucet device 6 according to an embodiment of the present invention. The setting process of the control of the faucet device 6 shown in the flowchart is performed by a CPU (central processing unit) of the calculator 3 according to a computer program stored in a ROM (read only memory) of the calculator 3. The setting process of the control of the faucet device 6 shown in FIG. 4 is performed, for example, after the FMCW radar 2 is installed in the faucet device 6 for the first time and before the faucet device 6 is used. The same setting process is also performed after the FMCW radar 2 is re-installed in the faucet device 6 and before the faucet device 6 is used.

First, an operation unit of the water discharge unit 8 is operated by a person to flow the water 9 from the water discharge unit 8 (see step 101 of FIG. 4). Next, when only the water 9 discharged from the water discharge unit 8 is present in the vicinity of the water discharge unit 8, the radio wave S is transmitted from the transmission antenna of the FMCW radar 2 under the control of the CPU (see step 102).

Next, the reflected wave of the radio wave S that hits the water 9 and is reflected by the water 9 is received by the reception antenna of the FMCW radar 2, and the signal intensity distribution of the received signal for each arrival angle and arrival distance, as shown in FIG. 3, is calculated by the calculation unit 3*a* (see step 103). Such a calculation is performed while the water 9 is flowing from the water discharge unit 8 for a fixed time. Next, the predetermined bin 21*a* with a large signal intensity of the received signal is determined, among the bins 21 partitioning the signal intensity distribution, by the determination unit 3*b* (see step 104).

Next, the signal intensity of the bin 21*a*, which has been determined as the predetermined bin by the determination unit 3*b*, as well as the arrival angle θ and the arrival distance R are temporarily stored in the storage unit 3*c* as a log under the control of the CPU. Next, a predetermined threshold is determined by the determination unit 3*b* based on the log data stored in the storage unit 3*c* (see step 105). The predetermined threshold is calculated by the determination unit 3*b* as, for example, a signal intensity obtained by adding a fixed offset value to the average value of the signal intensities of the received signals stored in the storage unit 3*c*. The predetermined threshold determined by the determination unit 3*b* is stored in the storage unit 3*c* (see step 106).

Figure 5:
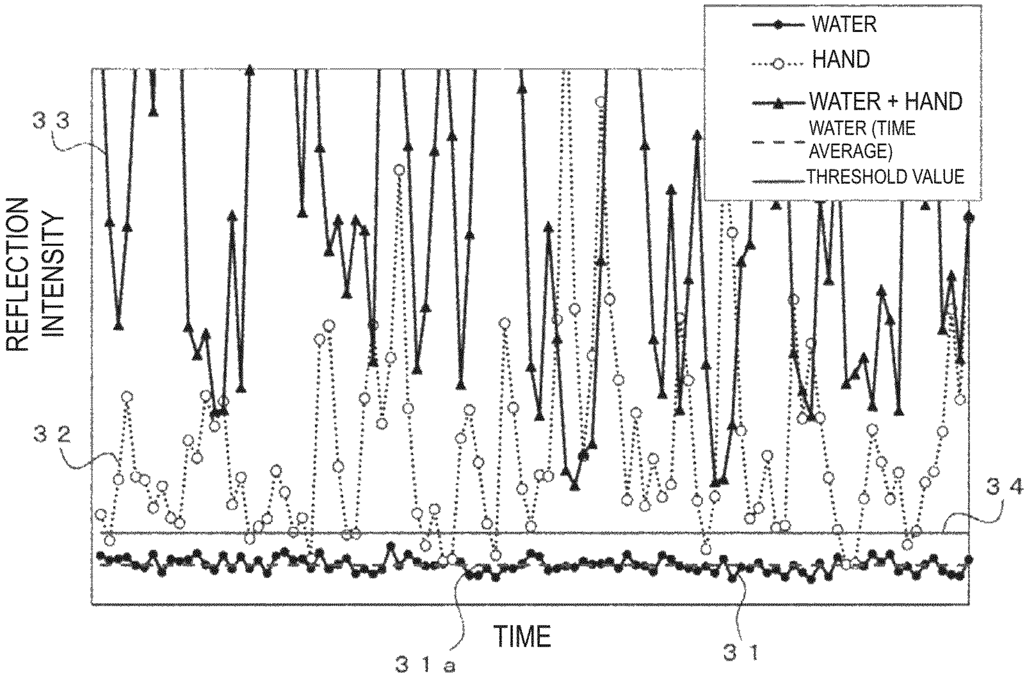
FIG. 5 is a graph explaining a predetermined threshold calculated by a determination unit constituting a control device of a faucet device according to an embodiment.

FIG. 5 is a graph for explaining the predetermined threshold. The horizontal axis of the graph represents the time, and the vertical axis represents the reflection intensity, i.e., the signal intensity of the received signal.

A characteristic line 31, in which plots of black circles are connected by a solid line, indicates the time transition of the signal intensity of the received signal received by the reception antenna when the water 9 is being discharged from the water discharge unit 8 and only the water 9 discharged from the water discharge unit 8 is present in the vicinity of the water discharge port of the water discharge unit 8. A straight line 31*a*, which is indicated by a long broken line crossing the characteristic line 31, represents the time average of the signal intensity indicated by the characteristic line 31.

A characteristic line 32, in which plots of white circles are connected by a short broken line, indicates the time transition of the signal intensity of the received signal received by the reception antenna when only a human hand is present in the vicinity of the water discharge port of the water discharge unit 8. A characteristic line 33, in which plots of triangle are connected by a solid line, indicates the time transition of the signal intensity of the received signal received by the reception antenna when the water 9 and a human hand are simultaneously present in the vicinity of the water discharge port of the water discharge unit 8.

The predetermined threshold is indicated as a solid straight line 34. The straight line 34 has the signal intensity obtained by adding a fixed offset value to the signal intensity of the straight line 31*a*, which is the average value of the signal intensity of the characteristic line 31 when only the water 9 is present in the vicinity of the water discharge port of the water discharge unit 8.

When the processing of step 106 is completed, the setting process of the control of the faucet device 6 is completed. When the faucet device 6 is actually used after the setting process has been completed, the following control is performed. The determination unit 3*b* determines, based on the signal intensity of the received signal detected at the predetermined bin 21*a*, whether the supply condition and the stop condition of the water 9 are satisfied, and outputs, based on the determination result, the supply signal or the stop signal to the control unit 4. Upon receiving the supply signal or the stop signal, the control unit 4 controls the opening and closing of the valve 5. In other words, when a received signal with a signal intensity exceeding the predetermined threshold is detected at the predetermined bin 21*a*, the supply signal is outputted from the determination unit 3*b* to the control unit 4, so that a signal for opening the valve 5 is outputted from the control unit 4 to the valve 5. As a result, the water 9 is supplied to the water discharge unit 8. When the received signal with a signal intensity exceeding the predetermined threshold is no longer detected at the predetermined bin 21*a*, the stop signal is outputted from the determination unit 3*b* to the control unit 4, so that a signal for closing the valve 5 is outputted from the control unit 4 to the valve 5. As a result, the supply of the water 9 to the water discharge unit 8 is stopped.

With the faucet device 6 and its control device 1 and control method according to the present embodiment, when only the water 9 discharged from the water discharge unit 8 is present in the vicinity of the water discharge unit 8, the signal intensity distribution of the reflected wave received by the reception antenna of the FMCW radar 2 for each arrival angle θ and arrival distance R is calculated by the processing of steps 101 to 103 of FIG. 4 as described above. Among the plurality of bins 21 in the calculated signal intensity distribution, the predetermined bin 21*a* with a large signal intensity of the received signal is determined in step 104, thereby estimating that the discharge region of the water 9 discharged by the water discharge unit 8 is present at the arrival angle θ and arrival distance R of the received signal assigned to the predetermined bin 21*a*.

When a received signal with a signal intensity exceeding the predetermined threshold is detected at the predetermined bin 21*a* after the setting process of the control of the faucet device 6 has been completed, it is determined that a detection target, such as a human hand or other part of a human, has entered the discharge region of the water 9 discharged by the water discharge unit 8. As a result, the supply signal is outputted from the determination unit 3*b* to the control unit 4, and the signal for opening the valve 5 is outputted from the control unit 4 to the valve 5. As a result, the water 9 is discharged from the water discharge unit 8. When the received signal with a signal intensity exceeding the predetermined threshold is no longer detected at the predetermined bin 21*a*, it is determined that the detection target has left the discharge region of the water 9 discharged by the water discharge unit 8. As a result, the stop signal is output from the determination unit 3*b* to the control unit 4, and the signal for closing the valve 5 is output from the control unit 4 to the valve 5. As a result, the supply of the water 9 to the water discharge unit 8 is stopped.

Therefore, with the faucet device 6 and its control device 1 and control method according to the present embodiment, even if a large object is present outside the discharge region of the water 9, the detection target can be detected without being affected by the object. Further, even if the installation position of the transmission antenna and the reception antenna of the control device 1, i.e., the installation position of the FMCW radar 2 changes, or the structure of the water discharge unit 8 and the water receiving bowl 7 changes, the predetermined bin 21*a* will correspond to the position of the discharge region of the water 9 formed at the time of the determination, according to the installation position of the FMCW radar 2 and the structure of the water discharge unit 8 and the water receiving bowl 7. Since the discharge region of the water 9 discharged from the water discharge unit 8 is flexibly specified according to the predetermined bin 21*a* determined in such a manner, the installation position of the control device 1 is not limited to a fixed position as in the conventional technique, so that the degree of freedom of the installation position of the control device 1 is increased.

To verify the above description, the operation of the control device 1 was confirmed when the FMCW radar 2 was installed at position A, B, C, or D on the upper surface of the water receiving bowl 7 on the side portion of the water discharge unit 8. In other words, the FMCW radar 2 was installed at each installation position A, B, C, or D; and at each installation position A, B, C, or D, the water was discharged from the water discharge unit 8, the radio wave S was transmitted from the transmission antenna, and the signal intensity distribution of the received signal of the reflected wave was calculated. Further, at each installation position A, B, C, or D, the signal intensity of the straight line 34 indicating the predetermined threshold was determined, and the control of the valve 5 by the control unit 4 was confirmed. As a result, it was confirmed that the control device 1 of the faucet device 6 normally recognizes the detection target in the discharge region of the water 9 discharged from the water discharge unit 8, and that the discharge and stop of the water 9 from the water discharge unit 8 are normally performed, as in the above embodiment.

With the control device 1 and the control method of the faucet device 6 according to the present embodiment, the detection target can be detected in the discharge region of the water 9 without performing the conventional complicated pattern recognition process (principal component analysis and multiple regression analysis). In the pattern recognition process, generally a DSP (digital signal processor) is required, so that the amount of information to be processed is large. In other words, in the conventional control device of the faucet device that performs the complicated pattern recognition process, a database with a large capacity for storing a large amount of sample data is required. On the other hand, in the control device 1 of the faucet device 6 according to the present embodiment, a database with a large capacity for storing a large amount of sample data is not required, so that the faucet device 6 and its control device 1 can be reduced in size. Further, since the control method of the faucet device 6 does not require the pattern recognition process, the processing can be simplified. As a result, the faucet device 6 and its control device 1 and control method capable of appropriately determining the presence or absence of a detection target around the water discharge unit 8 can be provided in a small size and at a low price.

When the detection target enters the discharge region of the water 9 discharged from the water discharge unit 8, the signal intensity of the received signal exceeds the predetermined threshold. This is indicated by the characteristic line 32 detected when a human hand or the like is present in the graph of FIG. 5. The characteristic line 32 exceeds the predetermined threshold indicated by the straight line 34 obtained by adding a fixed offset value to the straight line 31*a*. Therefore, with the faucet device 6 and its control device 1 and control method according to the present embodiment, when a received signal exceeding the predetermined threshold indicated by the straight line 34 is detected, it is determined that a detection target has surely entered the discharge region of the water 9. As a result, the control of supplying the water 9 to the water discharge unit 8 is surely performed by the control unit 4. Further, when the received signal exceeding the predetermined threshold indicated by the straight line 34 is no longer detected, it is determined that the detection target has surely left the discharge region of the water 9. As a result, the control of stopping the supply of the water 9 to the water discharge unit 8 is surely performed by the control unit 4.

Further, with the faucet device 6 and its control device 1 and control method according to the present embodiment, the bin 21*a* with the maximum average signal intensity among a fixed number of signal intensity distributions is determined as the predetermined bin in step 104 of FIG. 4. Therefore, the position of the predetermined bin 21*a* in the signal intensity distribution surely corresponds to the discharge region of the water 9, so that the estimation accuracy of the position of the discharge region of the water 9 is improved.

Further, with the control device 1 and control method of the faucet device 6 according to the present embodiment, the predetermined bin is determined by the determination unit 3*b* based on the signal intensity distribution calculated by the calculation unit 3*a* while the water 9 is being discharged from the water discharge unit 8 for a fixed time. Thus, a bin 21 with the reliably large signal intensity is determined as the predetermined bin 21*a*. Therefore, the position of the discharge region of the water 9 is estimated from the predetermined bin 21*a* without any error.

Figure 6:
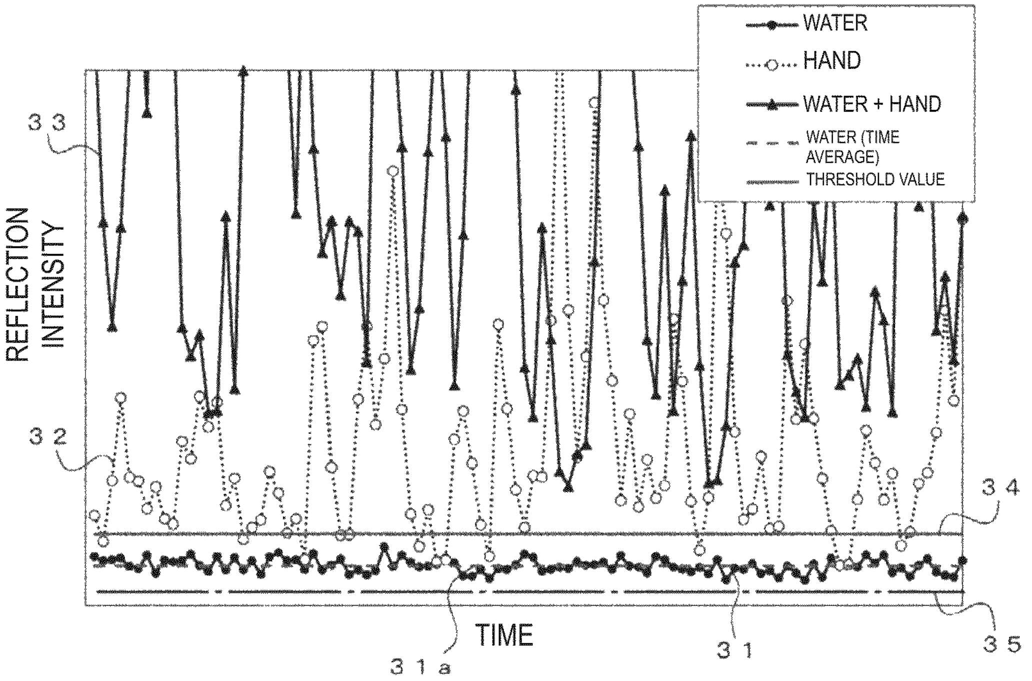
FIG. 6 is a graph explaining another predetermined threshold calculated by a determination unit constituting a control device of a faucet device according to an embodiment.

In the above embodiment, the value indicated by the straight line 34 based on the characteristic line 31 when only the water 9 is present is determined as the predetermined threshold. However, as indicated by the graph of FIG. 6, the predetermined threshold may also be determined separately as a predetermined threshold for discharging the water 9 and as a predetermined threshold for stopping the discharging of the water 9. The horizontal and vertical axes of the graph and the respective reference signs are the same as those in FIG. 5.

In such a case, the determination unit 3*b* determines a signal intensity indicated by a dash-dot straight line 35 as the predetermined threshold for discharging. The dash-dot straight line 35 is the signal intensity obtained by subtracting a fixed offset value from the average value indicated by the straight line 31*a* of the signal intensity of the received signal stored in the storage unit 3*c*. The determination unit 3*b* determines a signal intensity indicated by the solid straight line 34 as the predetermined threshold for stopping discharging. The solid straight line 34 is the signal intensity obtained by adding a fixed offset value to the average value indicated by the straight line 31*a* of the signal intensity of the received signal stored in the storage unit 3*c*. The determination unit 3*b* stores the determined predetermined threshold for discharging and the predetermined threshold for stopping discharging in the storage unit 3*c*.

The determination unit 3*b* outputs the supply signal to the control unit 4 when a received signal with a signal intensity exceeding the predetermined threshold for discharging is detected at the predetermined bin 21*a*. Upon receiving the supply signal, the control unit 4 controls the valve 5 to supply the water 9 to the water discharge unit 8. When a received signal with a signal intensity exceeding the predetermined threshold for stopping discharging is no longer detected at the predetermined bin 21*a*, the determination unit 3*b* outputs the stop signal to the control unit 4. Upon receiving the stop signal, the control unit 4 controls the valve 5 to stop the supply of the water 9 to the water discharge unit 8.

In a detection target, such as a hand, where the characteristic line 32 indicates the time transition of the signal intensity of the received signal, sometimes the signal intensity of the received signal falls below the predetermined threshold indicated by the straight line 34, and becomes very close to the straight line 31*a*. Therefore, it is assumed that it is possible that, when the predetermined threshold is the signal intensity indicated by the straight line 34, the water 9 is not discharged from the water discharge unit 8 even when the detection target enters the discharge region of the water 9. However, with the above configuration, since the determination unit 3*b* determines the signal intensity indicated by the straight line 35 as the predetermined threshold for discharging, the water 9 is more reliably discharged from the water discharge unit 8 when the detection target enters the discharge region of the water 9. Further, the determination unit 3*b* determines the signal intensity indicated by the straight line 34 as the predetermined threshold for stopping discharging. Therefore, when the detection target has left the discharge region of the water 9 and the received signal with a signal intensity exceeding the predetermined threshold for stopping discharging is no longer detected at the predetermined bin 21*a*, the supply of the water 9 to the water discharge unit 8 is surely stopped.

Figure 7:
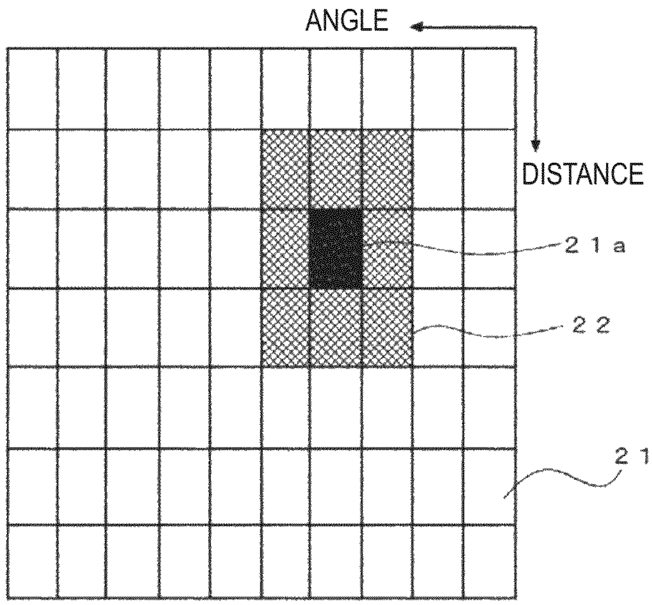
FIG. 7 is a mapping diagram showing a signal intensity distribution of received signals calculated by a calculation unit constituting a control device of a faucet device according to an embodiment, in which a fixed number of bins including a bin with the signal intensity of the maximum received signal and its surrounding bins are indicated.

Further, the determination unit 3*b* may obtain the predetermined bin and the threshold by using the average value of the signal intensity of the bin 21*a* and the bins 22 around the bin 21*a* indicated by hatched lines, as shown in FIG. 7. In such a case, the determination unit 3*b* obtains, for each bin 21, a time average value of the signal intensity of the corresponding bin 21 and its surrounding bins 22 from a fixed number of signal intensity distributions generated in a plurality with the lapse of time. The time average value is a value obtained by dividing, by a fixed number, the sum of the signal intensities of the bin 21 and its surrounding bins 22 with respect to the fixed number of signal intensity distributions generated in a plurality with the lapse of time. The obtained time average value is regarded as the average signal intensity of each bin 21. The determination unit 3*b* determines the bin 21*a* with the maximum intensity, among the obtained average signal intensities, and the bins 22 around the bin 21*a* as the predetermined bin.

With the present configuration, the detection range of the detection target can be deformed and expanded by setting a range obtained by combining a fixed number of bins including the bin 21*a* with the maximum average signal intensity and its surrounding bins 22 as the predetermined bin.

Further, the determination unit 3*b* may, for example, calculate the average value of the signal intensities of each bin 21 with respect to a fixed number of signal intensity distributions generated in a plurality with the lapse of time at a predetermined time after the water 9 is discharged from the water discharge unit 8 with a predetermined time interval, for each of the predetermined times, and obtain the average value of the signal intensities of each bin 21 as the moving average signal intensity of each bin 21. In such a case, a bin 21 with the maximum intensity, among the moving average signal intensities, is determined as the predetermined bin.

With the present configuration, instead of a bin 21 representing the average signal intensity with the maximum time average, a bin 21 representing the moving average signal intensity with the maximum moving average is determined as the predetermined bin. Therefore, with the present configuration, even if there is a period when the position and/or amount of flowing water is not stable, the estimation accuracy of the position of the predetermined bin in the signal intensity distribution can be improved by obtaining the moving average signal intensity.

In each of the above embodiments, a case in which water is discharged as the fluid from the discharge portion has been described. However, the fluid is not limited to water, and even in a case where liquid soap is discharged as the fluid from the discharge portion, the present invention can be applied in the same manner as the faucet device and its control device 1 and control method in each of the above embodiments.

In summary, the present invention is expressed as follows.

<1>

A control device of a faucet device, comprising:

- a transmission antenna that transmits a radio wave;
- a reception antenna that receives a reflected wave of the radio wave that hits a fluid and is reflected by the fluid;
- a calculation unit that calculates a signal intensity distribution of the reflected wave for each arrival angle and arrival distance;
- a determination unit that determines whether a supply condition and a stop condition of the fluid are satisfied, and outputs a supply signal or a stop signal based on a determination result; and
- a control unit that controls a supply of the fluid or a stop of the supply of the fluid based on the supply signal or the stop signal, wherein

- when only the fluid is being discharged, the determination unit determines a predetermined bin with a large signal intensity of the reflected wave among a plurality of bins partitioning the signal intensity distribution, determines a threshold based on the signal intensity of the predetermined bin, outputs the supply signal for supplying the fluid to the control unit when a reflected wave with a signal intensity exceeding the threshold is detected at the predetermined bin, and outputs the stop signal for stopping the supply of the fluid to the control unit when the reflected wave with a signal intensity exceeding the threshold is no longer detected at the predetermined bin.

<2>

The control device of a faucet device according to <1>, further comprising:

- a storage unit that stores the arrival angle, the arrival distance and the threshold assigned to the predetermined bin,
- wherein the determination unit determines a signal intensity obtained by adding a fixed offset value to an average value of the signal intensity of the predetermined bin as the threshold.

<3>

The control device of a faucet device according to <1>, further comprising:

- a storage unit that stores the arrival angle, the arrival distance and the threshold assigned to the predetermined bin,
- wherein the determination unit determines a signal intensity obtained by subtracting a fixed offset value from an average value of the signal intensity of the predetermined bin as a threshold for discharging and determines a signal intensity obtained by adding a fixed offset value to the average value of the signal intensity of the predetermined bin as a threshold for stopping discharging, outputs the supply signal to the control unit when a reflected wave with a signal intensity exceeding the threshold for discharging is detected at the predetermined bin, and outputs the stop signal to the control unit when a reflected wave with a signal intensity exceeding the threshold for stopping discharging is no longer detected at the predetermined bin.

<4>

The control device of a faucet device according to any one of <1> to <3>, wherein the determination unit obtains an average value of the signal intensity of each bin as an average signal intensity of each bin with respect to a fixed number of the signal intensity distributions generated in a plurality with a lapse of time, and determines a bin with a maximum intensity among the obtained average signal intensities as the predetermined bin.

<5>

The control device of a faucet device according to any one of <1> to <3>, wherein the determination unit obtains an average value of signal intensity of each bin and bins around each bin as an average signal intensity of each bin with respect to a fixed number of signal intensity distributions generated in a plurality with a lapse of time, and determines a bin with a maximum intensity among the obtained average signal intensities and bins around the bin as the predetermined bin.

<6>

The control device of a faucet device according to any one of <1> to <3>, wherein the determination unit calculates, at a predetermined time, an average value of the signal intensity of each bin with respect to a fixed number of the signal intensity distributions generated in a plurality with a lapse of time with a predetermined time interval, for each of the predetermined times, obtains an average value of the signal intensity of each bin as a moving average signal intensity of each bin, and determines a bin with a maximum intensity among the obtained moving average signal intensities as the predetermined bin.

<7>

The control device of a faucet device according to any one of <1> to <6>, wherein the determination unit determines the predetermined bin based on the signal intensity distribution calculated by the calculation unit while the fluid is being discharged for a fixed time.

<8>

A faucet device comprising:

the control device of a faucet device according to any one of <1> to <7>;

a valve that supplies the fluid or stops the supply of the fluid;

a discharge portion that is connected to the valve and that discharges the fluid; and a water receiving bowl.

<9>

A control method of a faucet device, comprising:

receiving, at a reception antenna and when only a discharged fluid is present, a reflected wave of a radio wave transmitted from a transmission antenna that hits the fluid and is reflected by the fluid;

calculating a signal intensity distribution of the reflected wave received by the reception antenna for each arrival angle and arrival distance;

determining a predetermined bin with a large signal intensity of the reflected wave among a plurality of bins partitioning the signal intensity distribution;

determining a threshold based on the signal intensity of the predetermined bin; and outputting a supply signal for supplying the fluid to a control unit that controls a supply of the fluid or a stop of the supply of the fluid when a reflected wave with a signal intensity exceeding the threshold is detected at the predetermined bin, and outputting a stop signal for stopping the supply of the fluid to the control unit when the reflected wave with a signal intensity exceeding the threshold is no longer detected at the predetermined bin.

REFERENCE SIGNS LIST

1 control device
2 FMCW radar
3 calculator
3*a* calculation unit
3*a*1 frequency analysis unit
3*a*2 detection recognition unit
3*b* determination unit
3*c* storage unit
4 control unit
5 valve
6 faucet device
7 water receiving bowl
8 water discharge unit (discharge portion)
9 water (fluid)
10 water pipe
11 pipe
21 bin
S radio wave

The invention claimed is:

1. A control device of a faucet device, comprising:

a transmission antenna that transmits a radio wave;

a reception antenna that receives a reflected wave of the radio wave that hits a fluid and is reflected by the fluid;

a calculator that calculates a signal intensity distribution of the reflected wave for each arrival angle and arrival distance;

a determinator that determines whether a supply condition and a stop condition of the fluid are satisfied, and outputs a supply signal or a stop signal based on a determination result; and a control circuitry that controls a supply of the fluid or a stop of the supply of the fluid based on the supply signal or the stop signal, wherein:

when only the fluid is being discharged, the determinator determines a predetermined bin with a large signal intensity of the reflected wave among a plurality of bins partitioning the signal intensity distribution, determines a threshold of the predetermined bin based on the signal intensity, outputs the supply signal for supplying the fluid to the control circuitry when the supply condition occurs, the supply condition being when the reflected wave with a signal intensity exceeding the threshold is detected at the predetermined bin, and outputs the stop signal for stopping the supply of the fluid to the control circuitry when the stop condition occurs, the stop condition being when the reflected wave with the signal intensity exceeding the threshold is no longer detected at the predetermined bin.

2. The control device according to claim 1, further comprising:

memory that stores the arrival angle, the arrival distance and the threshold assigned to the predetermined bin, wherein the determinator determines the threshold to be a signal intensity obtained by adding a fixed offset value to an average value of the signal intensity of the predetermined bin.

3. The control device according to claim 2, wherein the determinator obtains an average value of signal intensity of each bin and bins around each bin as an average signal intensity of each bin with respect to a fixed number of signal intensity distributions generated in a plurality with a lapse of time, and determines a bin with a maximum intensity among the obtained average signal intensities and bins around the bin as the predetermined bin.

4. The control device according to claim 1, further comprising:

memory that stores the arrival angle, the arrival distance and the threshold assigned to the predetermined bin, wherein the threshold includes a threshold for discharging and a threshold for stopping discharging, wherein the determinator determines the threshold for discharging to be a signal intensity obtained by subtracting a fixed offset value from an average value of the signal intensity of the predetermined bin, wherein the determinator determines the threshold for stopping discharging to be a signal intensity obtained by adding the fixed offset value to the average value of the signal intensity of the predetermined bin, and wherein the determinator outputs the supply signal to the control circuitry when the reflected wave with a signal intensity exceeding the threshold for discharging is detected at the predetermined bin, and outputs the stop signal to the control circuitry when a reflected wave with a signal intensity exceeding the threshold for stopping discharging is no longer detected at the predetermined bin.

5. The control device according to claim 1, wherein the determinator obtains an average value of the signal intensity of each bin as an average signal intensity of each bin with respect to a fixed number of the signal intensity distributions generated in a plurality with a lapse of time, and determines a bin with a maximum intensity among the obtained average signal intensities as the predetermined bin.

6. The control device according to claim 1, wherein the determinator calculates, an average value of the signal intensity of each bin with respect to a fixed number of the signal intensity distributions generated in a plurality with a lapse of time, and for each of a plurality of predetermined times, obtains an average value of the signal intensity of each bin as a moving average signal intensity of each bin, and determines a bin with a maximum intensity among the obtained moving average signal intensities as the predetermined bin.

7. The control device according to claim 1, wherein the determinator determines the predetermined bin based on the signal intensity distribution calculated by the calculator while the fluid is being discharged for a fixed time.

8. The control device of claim 1, wherein the reception antenna is among a plurality of reception antennas of the control device, and wherein the control device further includes a detection recognizer that estimates the arrival angle based on a phase difference between the plurality of reception antennas.

9. The faucet device of claim 8, wherein the determinator determines the threshold to be a signal intensity obtained by adding a fixed offset value to an average value of the signal intensity of the predetermined bin.

10. The faucet device of claim 8, wherein the reception antenna is among a plurality of reception antennas of the control device, and wherein the control device further includes a detection recognizer that estimates the arrival angle based on a phase difference between the plurality of reception antennas.

11. The faucet device of claim 8, further comprising:

memory that stores the arrival angle, the arrival distance and the threshold assigned to the predetermined bin, wherein the threshold includes a threshold for discharging and a threshold for stopping discharging, wherein the determinator determines the threshold for discharging to be a signal intensity obtained by subtracting a fixed offset value from an average value of the signal intensity of the predetermined bin, and wherein the determinator determines the threshold for stopping discharging to be a signal intensity obtained by adding the fixed offset value to the average value of the signal intensity of the predetermined bin.

12. The faucet device of claim 11, wherein the determinator outputs the supply signal to the control circuitry when the reflected wave with a signal intensity exceeding the threshold for discharging is detected at the predetermined bin, and outputs the stop signal to the control circuitry when a reflected wave with a signal intensity exceeding the threshold for stopping discharging is no longer detected at the predetermined bin.

13. The faucet device of claim 8, wherein the determinator obtains an average value of the signal intensity of each bin as an average signal intensity of each bin with respect to a fixed number of the signal intensity distributions generated in a plurality with a lapse of time, and determines a bin with a maximum intensity among the obtained average signal intensities as the predetermined bin.

14. A faucet device, comprising:

the control device of a faucet device according to claim 1;

a valve that supplies the fluid or stops the supply of the fluid;

a discharge portion that is connected to the valve and that discharges the fluid; and a bowl for receiving water.

15. A control method of a faucet device, comprising:

receiving, at a reception antenna and when only a discharged fluid is present, a reflected wave of a radio wave transmitted from a transmission antenna that hits the fluid and is reflected by the fluid;

calculating a signal intensity distribution of the reflected wave received by the reception antenna for each arrival angle and arrival distance;

determining a predetermined bin with a large signal intensity of the reflected wave among a plurality of bins partitioning the signal intensity distribution;

determining a threshold based on the signal intensity of the predetermined bin; and outputting a supply signal for supplying the fluid to a control circuitry that controls a supply of the fluid or a stop of the supply of the fluid when a reflected wave with a signal intensity exceeding the threshold is detected at the predetermined bin, and outputting a stop signal for stopping the supply of the fluid to the control circuitry when the reflected wave with a signal intensity exceeding the threshold is no longer detected at the predetermined bin.

16. The control method of claim 15, further comprising determining the threshold to be a signal intensity obtained by adding a fixed offset value to an average value of the signal intensity of the predetermined bin.

17. The control method of claim 15, wherein the reception antenna is among a plurality of reception antennas of a control device, and wherein the method further comprises estimating the arrival angle based on a phase difference between the plurality of reception antennas.

18. The control method of claim 15, further comprising:

storing, by memory, the arrival angle, the arrival distance and the threshold assigned to the predetermined bin, wherein the threshold includes a threshold for discharging and a threshold for stopping discharging, and wherein the method further includes:

determining the threshold for discharging to be a signal intensity obtained by subtracting a fixed offset value from an average value of the signal intensity of the predetermined bin, and determining the threshold for stopping discharging to be a signal intensity obtained by adding the fixed offset value to the average value of the signal intensity of the predetermined bin.

19. The control method of claim 18, further comprising outputting the supply signal to the control circuitry when the reflected wave with a signal intensity exceeding the threshold for discharging is detected at the predetermined bin, and outputs the stop signal to the control circuitry when a reflected wave with a signal intensity exceeding the threshold for stopping discharging is no longer detected at the predetermined bin.

20. The control method of claim 15, further comprising obtaining an average value of the signal intensity of each bin as an average signal intensity of each bin with respect to a fixed number of the signal intensity distributions generated in a plurality with a lapse of time, and determining a bin with a maximum intensity among the obtained average signal intensities as the predetermined bin.

* * * * *